Figure 2A:
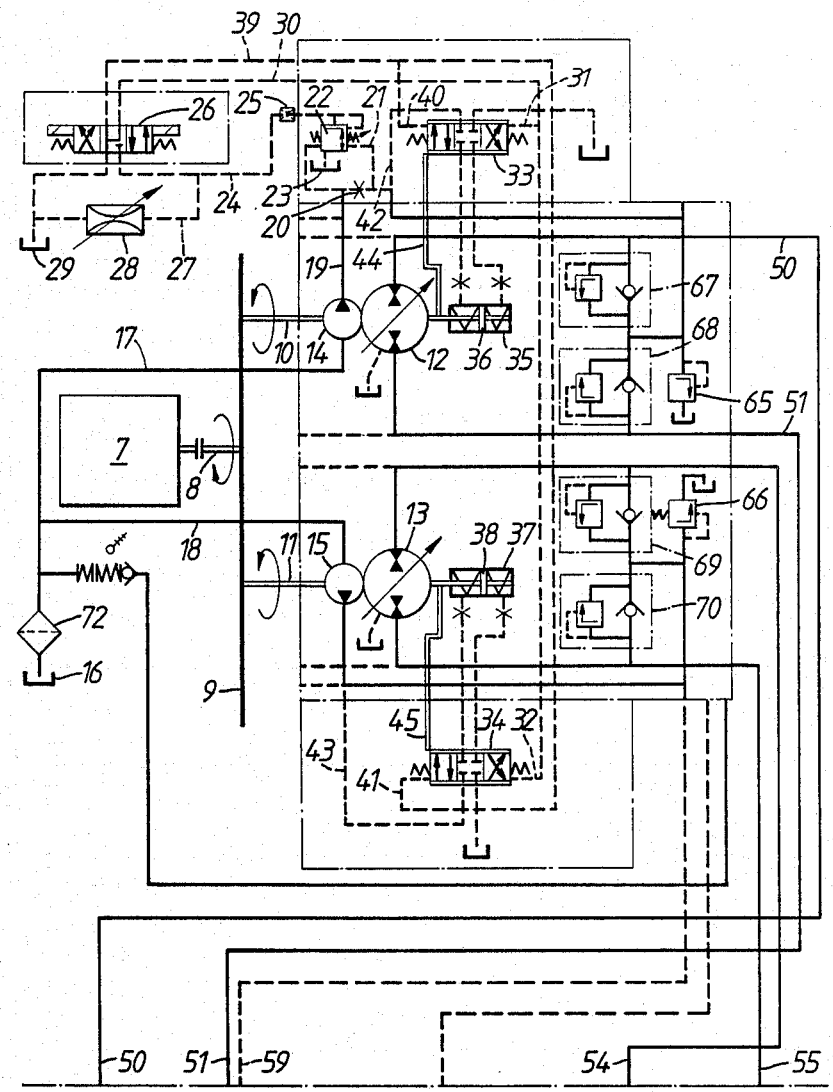

United States Patent [19]

Kostamo

[11] Patent Number: 4,805,719
[45] Date of Patent: Feb. 21, 1989

[54] VEHICLE

[75] Inventor: Pentti Kostamo, Jyvaskyla, Finland

[73] Assignee: Valmet Oy, Helsinki, Finland

[21] Appl. No.: 98,216

[22] Filed: Sep. 18, 1987

[51] Int. Cl.$^4$ ............................................. B60K 17/34
[52] U.S. Cl. ..................................... 180/242; 60/430; 180/307
[58] Field of Search ............... 180/242, 235, 307, 305; 60/430, 484, 486

[56] References Cited

U.S. PATENT DOCUMENTS 3,641,765  2/1972  Hancock et al. ............... 180/242 X

FOREIGN PATENT DOCUMENTS 2535762  2/1976  Fed. Rep. of Germany ...... 180/242
2119905  11/1983  United Kingdom ................. 180/307

OTHER PUBLICATIONS

"Mobile Hydraulic Components" Mannesmann Rexroth, GmbH, vol. XI, pp. 161,164,165 and 283-290.

Primary Examiner—John A. Pekar
Attorney, Agent, or Firm—Armstrong, Nikaido, Marmelstein & Kubovcik

[57] ABSTRACT

A vehicle is described having a front pair of ground contacting wheels, a rear pair of ground contacting wheels, an internal combustion engine, hydraulic motors for driving each said ground contacting wheel, and a plurality of variable flow hydraulic pumps for driving the hydraulic motors. In such a vehicle the internal combustion engine (7) is arranged to drive directly first and second variable displacement pumps (12, 13) for driving the motors (46, 47) of the front pair of wheels (2) and the motors (47, 48) of the back pair of wheels (3) respectively as well as first and second boost pumps (14, 15), while a control valve (22) is supplied with hydraulic fluid from one of the boost pumps (14) and is arranged to give an output hydraulic pressure which is dependent on the speed of the engine (7). A further valve (33, 34) is positioned under the control of the output hydraulic pressure from the control valve (22) in the path of hydraulic fluid from each of the boost pumps (14, 15) to a respective operating piston and cylinder arrangement (35, 36; 37, 38) for adjusting the displacement of the hydraulic pumps (12, 13) in dependence on the speed of the engine (7).

6 Claims, 3 Drawing Sheets

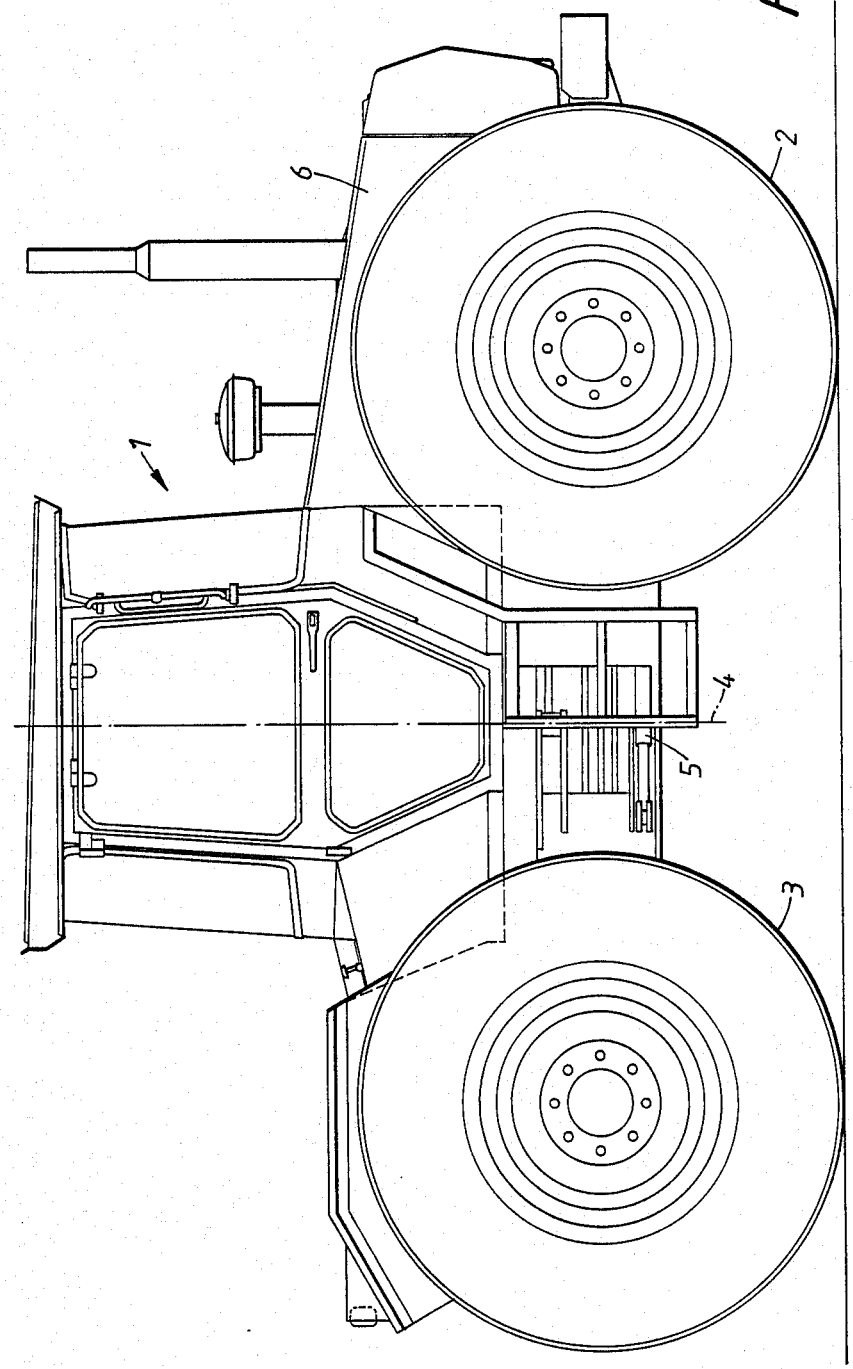

VEHICLE

This invention relates to vehicles.

It is known to propel a tractor by means of a hydraulic traction arrangement in which each of the four ground contacting wheels has its own individual hydraulic motor which is actuated by a respective hydraulic pump driven by a diesel engine on the tractor.

It is an object of the present invention to provide an improved form of tractor or other vehicle having a hydraulic drive arrangement.

According to the present invention there is provided a vehicle having a front pair of ground contacting wheels, a rear pair of ground contacting wheels, an internal combustion engine, hydraulic motors for driving each said ground contacting wheel, and a plurality of variable flow hydraulic pumps for driving the hydraulic motors, wherein the internal combustion engine is arranged to drive directly first and second variable displacement pumps for driving the motors of the front pair of wheels and the motors of the back pair of wheels respectively and also to drive first and second boost pumps, wherein a control valve is supplied with hydraulic fluid from one of the boost pumps and is arranged to give an output hydraulic pressure which is dependent on the speed of the engine, and wherein a further valve is positioned, under the control of the output hydraulic pressure from the control valve, in the path of hydraulic fluid from each of the boost pumps to a respective operating piston and cylinder arrangement for adjusting the displacement of the hydraulic pumps in dependence on the speed of the engine.

In one arrangement a direction selection valve under the driver's control is positioned on the output side of the control valve between the control valve and the further valves for controlling the direction of movement of the vehicle. A bleed line having a pressure relief valve under the driver's control may be connected on the output side of the control valve for braking the vehicle.

It is preferred that the hydraulic motors are three speed hydraulic motors. Selection of the speed of the motors can be under the control of a respective valve operable by the driver and actuated by a pilot pressure provided at the output side of the other boost pump.

It is further preferred that a two position valve is provided in the hydraulic circuit between each variable displacement pump and its respective hydraulic motors to permit the motors to be driven in synchronism in response to a pressure signal from a control valve under the driver's control.

Preferably the internal combustion engine is a diesel engine, although a spark ignition engine can alternatively be used.

Figure 2B:
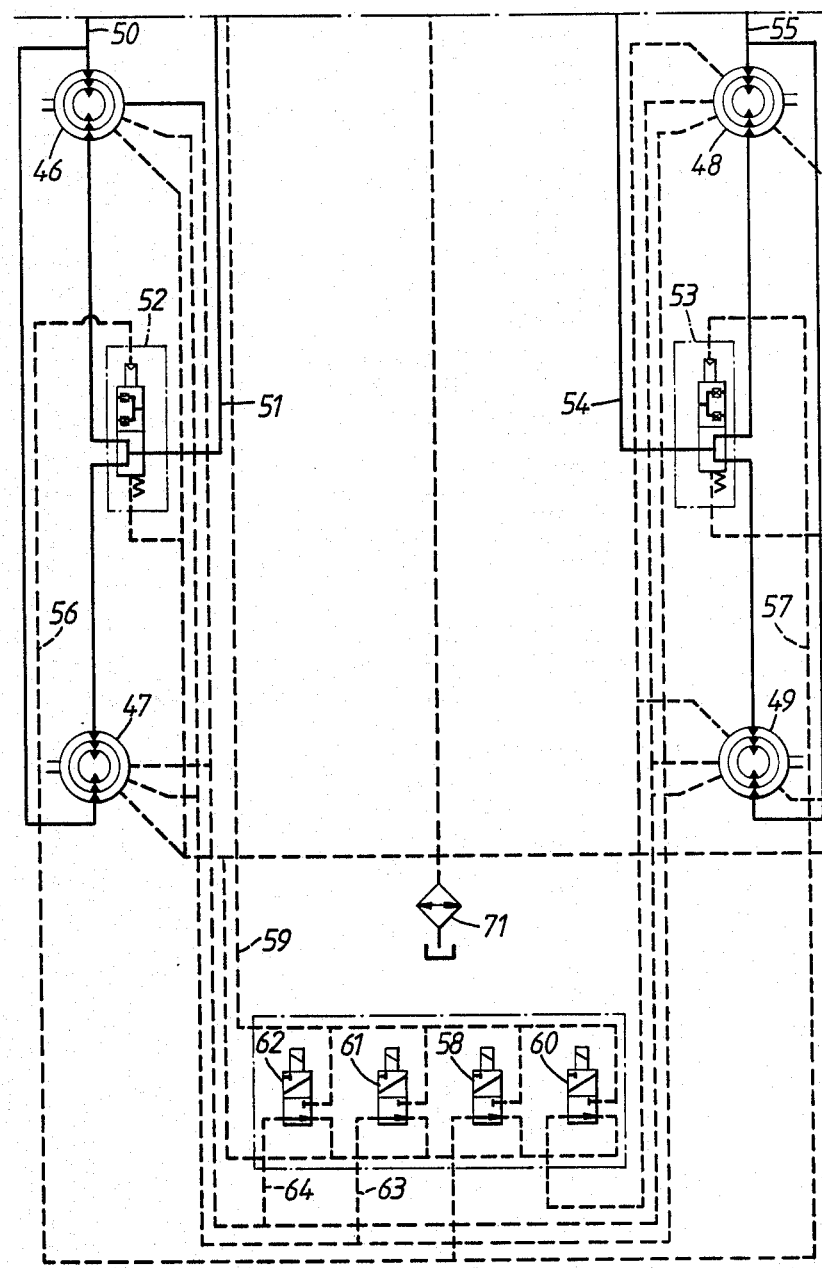

In order that the invention may be clearly understood and readily carried into effect, a preferred embodiment thereof will now be described, by way of example only, with reference to the accompanying drawings, wherein:

FIG. 1 is a side view of a tractor; and
FIG. 2 is a hydraulic flow diagram illustrating the drive arrangement for the tractor of FIG. 1.

Referring to the drawings, a tractor 1 has a pair of ground contacting front wheels 2 and a pair of ground contacting rear wheels 3, each fitted with a respective hydraulic motor. Tractor 1 is articulated about a vertical pivot (whose axis is indicated at 4 in FIG. 1) for steering purposes, control of the direction of the tractor being achieved by means of steering rams 5. The front portion of the tractor carries a diesel engine under bonnet 6 which drives a pair of variable displacement hydraulic pumps. Each such pump supplies hydraulic fluid under pressure to the hydraulic motors of a respective pair of wheels 2 or 3.

FIG. 2 is a hydraulic flow diagram of the drive arrangement for tractor 1. The diesel engine 7 has a drive shaft 8 which drives, by means of a gear train 9, the drive shafts 10, 11 of a pair of variable displacement hydraulic pumps 12, 13, each of the axial piston swashplate design. A unit embodying a pair of such pumps is available under the designation "Variable Double Pump A5VG Series 11" from Mannesmann Rexroth GmbH, Jahnstrasse 3-5, D-8770 Lohr am Main, Federal Republic of Germany. Each pump 12, 13 has associated therewith a respective boost pump 14, 15 driven by the associated drive shaft 10, 11.

Hydraulic fluid is drawn from a reservoir 16 through lines 17, 18 as needed by boost pumps 14, 15. The output from boost pump 14 is fed by way of line 19, throttle 20, and line 21 to a first pressure actuated control valve 22 which has a spring-loaded spool mounted within a body, the spool having a throttle washer through which fluid can return to the reservoir (as indicated at 23). When the rate of flow in line 21 exceeds a threshold value, the spool of valve 22 moves against its spring and allows fluid to flow in line 24 and through throttle 25 to a flow direction control valve 26 which is coupled to a gear selector lever (forward-neutral-reverse) situated in the cab of tractor 1. A valve suitable for use as valve 22 is sold by Mannesmann Rexroth GmbH under the designation "Control Valve DA".

A bypass line 27 is connected to line 24 and has a valve 28 mounted therein. Valve 28 is coupled to a brake pedal in the cab of tractor 1 and, when open, permits fluid to return to the reservoir (as indicated at 29).

Assuming that the driver of the tractor 1 has selected "forward", valve 26 permits fluid to pass in line 30 to a respective pilot pressure port 31, 32 of a further control valve 33, 34 associated with pumps 12, 13. Each of valves 33, 34 may be of the type sold under the designation "Control Valve HD" by Mannesmann Rexroth GmbH. Valve 33 is used to control the flow of fluid from boost pump 14 to a cylinder 35, a piston 36 in which controls the position of the swashplate of pump 12 and hence its displacement. In a similar manner valve 34 is used to control the flow of fluid from boost pump 15 to a cylinder 37, in which slides a piston 38 that controls the swashplate, and hence the displacement, of pump 13.

Reference numeral 39 indicates a return line connected to the other pilot pressure ports 40, 41 on valves 33, 34 for return of hydraulic fluid supplied via ports 31, 32 back through direction selector valve 26 to reservoir 29.

In operation of the tractor 1, the speed of diesel engine 7 is under the control of the driver by means of a conventional accelerator pedal in the cab. Depending upon the position of valve 26, either a zero pilot pressure is present in lines 30 and 39, if "neutral" is selected, or a positive pilot pressure is present in either line 30 or line 39, depending whether the driver has selected "forward" or "reverse" by means of valves 26. This pilot pressure is dependent upon the speed of diesel engine 7 and opens valves 33, 34 to an extent dependent on such engine speed.

Supply of fluid to valve 33 from boost pump 14 is by way of line 19, throttle 20, and line 42, whilst the corresponding flow of fluid from boost pump 15 to valve 34 is by way of line 43. Precise feedback control over the position of the spool of valve 33 is achieved by means of a conventional mechanical linkage, indicated at 44, linked to the piston 36. In a similar fashion precise feedback control over the position of the spool of valve 34 is achieved by means of a conventional mechanical linkage 45 coupled to piston 38.

Pump 12 supplies the three speed hydraulic motors 46, 47 of the front wheels 2, whilst pump 13 supplies the three speed hydraulic motors 48, 49 of the rear wheels 3. The rate and direction of rotation of wheels 2, 3 depends upon the positions of the swashplates of pumps 12 and 13, as determined by the selector valve 26 and the speed of diesel engine 7 in the manner described above.

It will be seen that the speed of motors 46, 47, 48, 49 is controlled by valve 22 which produces a pilot pressure dependent upon the speed of diesel engine 7 that is applied, depending upon the position of selector valve 26, to the selected pilot ports 31, 32 or 40, 41 of control valves 33, 34 which in turn provide control of the pistons for the swashplates of pump 12, 13. Thus a single control valve 22 controls both pumps 12, 13.

The hydraulic fluid supply and return lines for hydraulic motors 46, 47 are indicated by reference numerals 50, 51. A two position spring loaded valve 52 in line 51 allows each of motors 46, 47 to take fluid freely from pump 12 when the spool of valve 52 is in the position shown in FIG. 2. In its other operating position the spool of valve 52 provides a 50/50 split between motors 46 and 47 so as to obviate wheel slip. A similar valve 53 is positioned in line 54 which forms one of the supply and return lines 54, 55 for motors 48, 49. Operation of valves 52, 53 is effected by applying a pilot pressure in lines 56, 57 by means of a valve 58, which is coupled to a switch under the driver's control in the cab of tractor 1. This pilot pressure is drawn from the output of boost pump 15 in line 59. By operating valve 58 the driver can ensure synchronous drive of the motors 46, 47, 48, 49 to avoid wheel spin.

Line 59 also provides a pilot pressure to the valve 60 which is arranged to operate a parking brake for the tractor. It also provides a pilot pressure for valves 61, 62 which are operable by the driver to select the appropriate speed range (first, second or third gear) for the hydraulic motors 46, 47, 48, 49. Depending upon the position of the spool in valves 61, 62 a corresponding pilot pressure may or may not be present also in line 63 and/or line 64. In combination therefore valves 61, 62 permit a total of four signals to be sent to hydraulic motors 46, 47, 48, 49; three of these possible four combinations of pilot pressures in lines 63, 64 are used to select a respective one of the three speed ranges (e.g. 0–12 km/h or 0–18 km/h or 0–35 km/h) of the hydraulic motors 46, 47, 48, 49.

Pressure relief valves 65, 66 are used to set the maximum pilot pressure from the boost pumps 14, 15 at some suitable value, e.g. about 30 bar. The minimum pilot pressure, e.g. about 6 bar, is set by valve 22. Pressure relief valves 65, 66 also act to provide a corresponding minimum pressure in the respective suction lines for the variable displacement pumps 12, 13. Pressure relief valves 67, 68 are set at a suitable value, e.g. about 440 bar, to limit the maximum output pressure from pump 12, whichever direction of flow in lines 50, 51 happens to prevail at any given time. Similar pressure relief valves 69, 70 are provided for pump 13.

A conventional cooling arrangement indicated at 71 can be used to control the temperature of the circulating hydraulic fluid, whilst filter 72 ensures dirt-free circulation thereof. The remainder of the hydraulic circuit, including return lines and connections to the hydraulic fluid reservoir, is indicated in FIG. 2 of the drawings and does not require further description.

If desired, a further variable displacement pump (not shown) can be coupled in parallel with pumps 12, 13 or in line with one of them for the purpose of driving an auxiliary item of equipment which must be operated at a speed that is dependent upon the speed of diesel engine 7. Such further pump may be used, for example, for driving the wheels of a trailer or for operating a distributor for a fertiliser, herbicide, pesticide, or the like. In such auxiliary equipment it is important that the drive speed should be matched to that of the drive wheels 2, 3 and that of diesel engine 7. Such a further pump conveniently has a boost pump (similar to boost pumps 14, 15) and its swashplate is under the control of a valve similar to valves 33, 34, which is in turn controlled by a pilot pressure from valve 22.

Instead of driving pumps 12, 13 and their boost pumps 14, 15 in parallel, diesel engine 7 can be arranged to drive them in line.

The illustrated tractor has very simple driving controls. Thus the only controls needed are an accelerator to control diesel engine 7, a direction selector lever to operate valve 26, a foot brake to operate valve 28, and a speed range selector lever which operates valves 61, 62. A parking brake control acts on valve 60, whilst wheel slip can be obviated by operation of valve 58 by a switch in the tractor cab.

What is claimed is:

1. A vehicle having a front pair of ground contacting wheels, a rear pair of ground contacting wheels, an internal combustion engine, hydraulic motors for driving each said ground contacting wheel, and a plurality of variable flow hydraulic pumps for driving the hydraulic motors wherein the internal combustion engine is arranged to drive directly a first variable displacement pump for driving the motors of the front pair of wheels and a second variable displacement pump for driving the motors of the rear pair of wheels and also to drive first and second boost pumps; a pressure actuated control valve is supplied with hydraulic fluid from one of the boost pumps and is arranged to give, on the downstream side of a throttle positioned in the path of hydraulic fluid from the control valve, an output hydraulic pressure which is dependent on the speed of the engine; and a pair of further valves, which are responsive to the output hydraulic pressure from the control valve, and are positioned each in the path of hydraulic fluid from a respective boost pump to a corresponding respective operating piston and cylinder arrangement for adjusting the displacement of a respective variable displacement pump in dependence on the speed of the engine.

2. A vehicle according to claim 1, wherein a direction selection valve under the driver's control is positioned on the output side of the control valve between the control valve and the further valves for controlling the direction of movement of the vehicle.

3. A vehicle according to claim 1, wherein a bleed line having a bleed valve under the driver's control is connected on the output side of the control valve for braking the vehicle.

4. A vehicle according to claim 1, wherein the hydraulic motors are three speed hydraulic motors.

5. A vehicle according to claim 4, wherein selection of the speed range of the motors is under the control of a set of speed control valves operable by the driver and actuated by a pilot pressure provided at the output side of a boost pump.

6. A vehicle according to claim 1, wherein a two position flow divider valve, which is responsive to a pressure signal from a corresponding control valve under the driver's control, is provided in the hydraulic circuit between each variable displacement pump and its respective pair of hydraulic motors for dividing the flow of hydraulic fluid between the pair of hydraulic motors, said two position valve providing in one position thereof a flow divider which provides equal flow to each motor of the respective pair of motors thereby to permit the motors to be driven in synchronism in response to said pressure signal from said control valve.

* * * * *